United States Patent

Savatsky et al.

(10) Patent No.: US 10,113,019 B2
(45) Date of Patent: Oct. 30, 2018

(54) METHODS OF CHANGING POLYOLEFIN PRODUCTION CONDITIONS TO MITIGATE SMALL GELS IN A POLYOLEFIN ARTICLE

(71) Applicant: Univation Technologies, LLC, Houston, TX (US)

(72) Inventors: Bruce J. Savatsky, Kingwood, TX (US); James M. Farley, League City, TX (US); Daniel P. Zilker, Jr., Easton, PA (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/527,957

(22) PCT Filed: Nov. 24, 2015

(86) PCT No.: PCT/US2015/062402
§ 371 (c)(1),
(2) Date: May 18, 2017

(87) PCT Pub. No.: WO2016/085972
PCT Pub. Date: Jun. 2, 2016

(65) Prior Publication Data
US 2017/0355790 A1   Dec. 14, 2017

Related U.S. Application Data

(60) Provisional application No. 62/084,256, filed on Nov. 25, 2014.

(51) Int. Cl.
*C08F 110/02* (2006.01)
*C08F 2/34* (2006.01)
(Continued)

(52) U.S. Cl.
CPC .......... *C08F 110/02* (2013.01); *B01J 8/1818* (2013.01); *B01J 13/0065* (2013.01)

(58) Field of Classification Search
CPC ...... C08F 2/34; C08F 110/02; C08F 2500/12; B01L 8/1818; B01L 13/0065; B01J 8/24
(Continued)

(56) References Cited

U.S. PATENT DOCUMENTS

| 7,875,690 B2 * | 1/2011 | Graham | ................ C08F 210/16 526/348 |
| 2003/0213938 A1 * | 11/2003 | Farley | ................ C08L 23/0815 252/500 |

(Continued)

OTHER PUBLICATIONS

International Search Report and Written Opinion for related PCT Application PCT/US2015/062402, dated Mar. 9, 2016 (12 pgs).
(Continued)

*Primary Examiner* — Fred M Teskin
(74) *Attorney, Agent, or Firm* — Brooks, Cameron & Huebsch, PLLC

(57) ABSTRACT

The number of small gels that form in polyolefin thin films may be reduced by altering certain production parameters of the polyolefin. In some instances, the number of small gels may be influenced by the melt index of the polyolefin. However, in many instances, melt index is a critical part of the polyolefin product specification and, therefore, is not manipulated. Two parameters that may be manipulated to mitigate small gel count while maintaining the melt index are polyolefin residence time in the reactor and ICA concentration in the reactor.

15 Claims, 3 Drawing Sheets

(51) Int. Cl.
*B01J 8/18* (2006.01)
*B01J 8/24* (2006.01)
*B01J 13/00* (2006.01)

(58) Field of Classification Search
USPC .................................................. 526/160, 903
See application file for complete search history.

(56) References Cited

U.S. PATENT DOCUMENTS

2005/0282980 A1  12/2005  Szul et al.
2007/0060724 A1  3/2007   Ker et al.

OTHER PUBLICATIONS

Second Written Opinion for related PCT Application PCT/US2015/062402, dated Nov. 15, 2016 (9 pgs).
International Preliminary Report on Patentability for related PCT Application PCT/US2015/062402, dated Feb. 15, 2017 (16 pgs).

* cited by examiner

METHODS OF CHANGING POLYOLEFIN PRODUCTION CONDITIONS TO MITIGATE SMALL GELS IN A POLYOLEFIN ARTICLE

This application is a National Stage Application under 35 U.S.C. § 371 of International Application Number PCT/US2015/062402, filed Nov. 24, 2015 and published as WO 2016/085972 on Jun. 2, 2016, which claims the benefit to U.S. Provisional Application 62/084,256, filed Nov. 25, 2014, the entire contents of which are incorporated herein by reference in its entirety.

BACKGROUND

The exemplary embodiments described herein relate to methods for producing polyolefin polymers.

Typical polyolefin polymerization reactions in a fluidized bed gas phase reactor employ a continuous cycle. In one part of the cycle, a cycling gas stream (sometimes referred to as a recycle stream or fluidizing medium) is heated in the reactor by the heat of polymerization. This heat is removed from the recycle stream in another part of the cycle by a cooling system external to the reactor. Generally, in a gas fluidized bed process for producing a polyolefin product, the recycle stream is a primarily gaseous stream containing an olefin monomer, optionally hydrogen, and optionally at least one comonomer that is continuously cycled through the fluidized bed in the presence of a catalyst under reactive conditions. The recycle stream is withdrawn from the fluidized bed and (after cooling) is recycled back into the reactor. Simultaneously, polymer product is withdrawn from the reactor and fresh olefin monomer, the optional hydrogen, and the optional comonomers are added to replace any that has polymerized or been entrained in the polyolefin product stream.

In some conventional polymerization reactions, a fluidized bed gas phase reactor system operates in a "condensed mode" (e.g., as described in International Patent App. Pub. No. WO 2007/030915) in which the recycle stream is cooled to a temperature below the dew point in the reactor. Typically, this is accomplished by including an ICA in an appropriate concentration and controlling the recycle stream temperatures so as to condense the ICA portion of the recycle gas stream. Generally, condensed mode production of polyolefins facilitates a greater production rate of the polyolefin.

The polyolefin from the reactor is typically in the form of granules that may be degassed and then extruded into pellets that are sold to customers. The pellets may then be processed into various articles including thin films for food packaging, resealable baggies, and the like. Such articles preferably have very high clarity and few defects. One source of defects that also impact clarity is small gels (i.e., gel particles having a diameter of 201 microns to 600 microns). It is believed that the small gels arise from portions of the polyolefin that have not completely melted and blended with the surrounding polyolefin.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
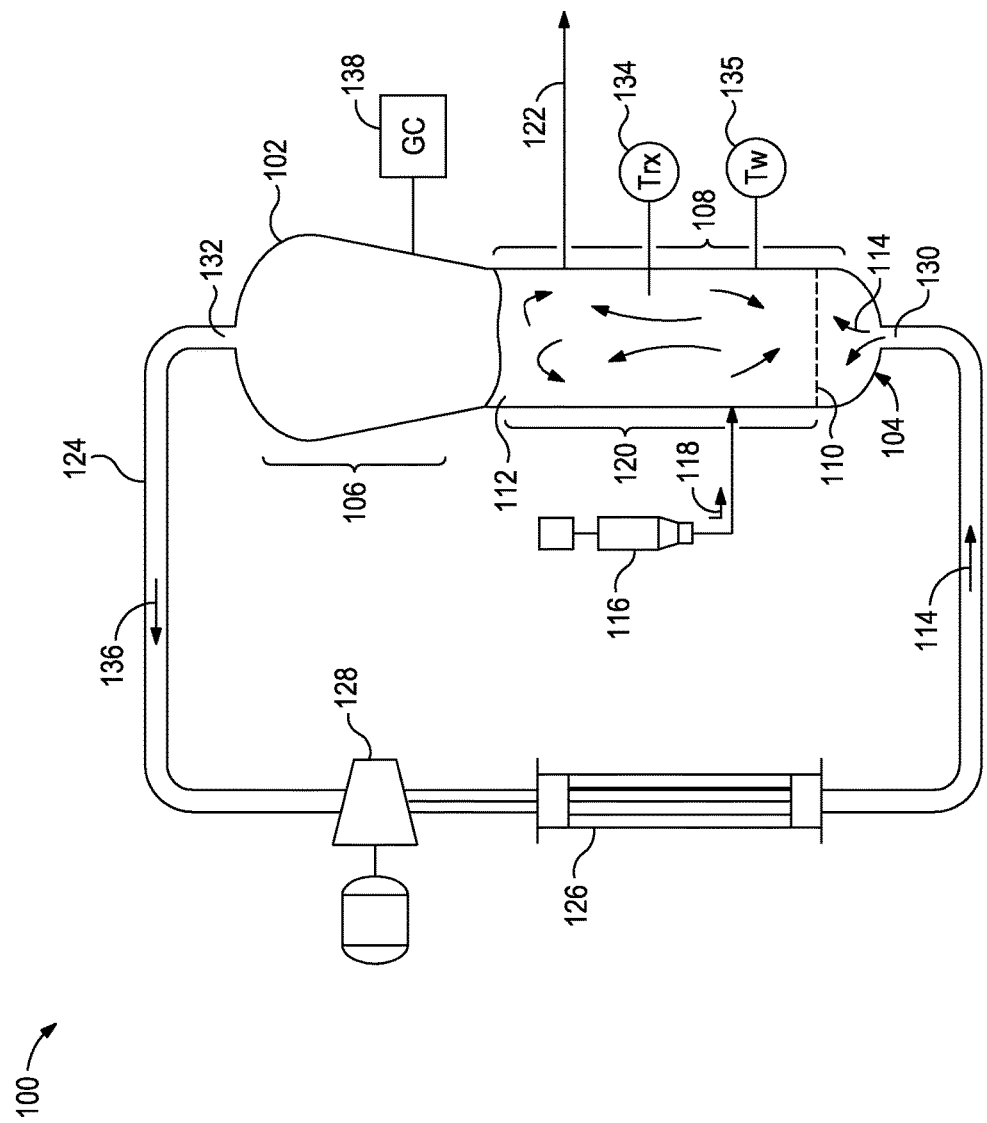
FIG. 1A is a schematic diagram of a polymerization system that can be monitored and controlled in accordance with some of the embodiments described herein.

The exemplary embodiments described herein relate to methods for producing polyolefin polymers to reduce the amount of small gels (also referred to as "small gel count") in a thin film produced therefrom.

Generally, it is believed that mitigation of small gels is best effected when blending the polyolefin resin and extruding it into pellets. Surprisingly, it has been discovered that the parameters of polyolefin production also have a significant impact on the small gel count of a thin film produced therefrom. In some instances, the number of small gels may be influenced by the melt index of the polyolefin. However, in many instances, melt index is generally a critical part of the polyolefin product specification and, therefore, is not manipulated. It has been discovered that two parameters that may be manipulated to mitigate small gel count while maintaining the melt index are polyolefin residence time in the reactor and ICA concentration in the reactor. It has been discovered that increasing the residence time, increasing the ICA concentration, or both reduce the occurrences of small gels in a polyolefin thin film.

In some instances, a catalyst (e.g., a hafnium metallocene catalyst) may be chosen to produce a wide molecular weight distribution. The wide distribution may make the produced polyolefin more prone to the formation of small gels in thin films. Therefore, the production methods and parameters described herein may, in some instances, be particularly relevant to polyolefin polymerization reactions that utilize hafnium metallocene catalysts or other catalysts producing a wide molecular weight distribution.

As used herein, the amount of small gels is determined by surface inspection of a 50 micron ±5 micron thin film using optoelectronic analysis with a high resolution line camera. A system suitable for producing and analyzing films for small gels can be prepared by Optical Control Systems GmbH, Witten, Germany, to include Model ME-20/2800 extruder, a CR-9 chill role/wind-up unit, and a FSA100™ Film Testing System. Generally, polymer pellets are extruded through a flat die where the chill roll speed is adjusted to maintain film thickness of 50 microns and the winder force/tension is adjusted to maintain a high quality, flat film that is free of wrinkles. The produced film is then passed between the light source and the camera where small gels are detected by the amount of light that is diffracted. Parameters for producing the film with a FSA100™ Film Testing System include: a screw speed of 50 rpm, extrusion output of about 1.3 kg/hr, a zone 1 feed temperature of 190° C., a zone 2 barrel temperature of 200° C., a zone 3 barrel temperature of 215° C., a zone 4 adapter temperature of 215° C., a zone 5 die temperature of 215° C., a die angle of 45°, use of an air knife, and a chill roll temperature of 30° C.±10° C. Parameters for analyzing the film with the FSA100™ Film Testing System include: a camera to film distance of 250 mm, a light to film distance of 40 mm, an x-resolution of 50 microns, a y-resolution of 50 microns, and a shading correction grey level of 180 with an interval and buffer size of 250.

As used herein, the term "ICA" refers to the total ICA in the reactor and encompasses compositions with one or more ICA components. As used herein, the term "ICA component" refers to individual components of an ICA. For example, an ICA may include isopentane, n-butane or a combination thereof. Exemplary ICA components suitable for use in the methods described herein may include, but are not limited to, n-butane, isobutane, n-pentane, isopentane, hexane, isohexane, and other hydrocarbon compounds that are similarly non-reactive in the polymerization process.

As used herein, the term "residence time" refers to the average residence time of the polyolefin in the reactor bed, which may be calculated as the bed weight of polyolefin (lb or kg) in the reactor divided by the polyolefin production rate (lb/h or kg/h, respectively).

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

As used herein, the term "polyethylene" denotes a polymer of ethylene and optionally one or more $C_3$-$C_{18}$ alpha-olefins, while the term "polyolefin" denotes a polymer of one or more $C_2$-$C_{18}$ alpha-olefins.

As used herein, the term "melt index" refers to a measure of the use of flow of the melt of the thermoplastic polymer. Melt index may be measured according to ASTM D1238-13 at any suitable weight and temperature. Generally, the melt index of polyolefins is measured at 2.16 kg at 190° C., 5 kg at 190° C., or 21.6 kg at 190° C.

Reactor

The methods described herein may be used in any number of pilot plant or commercial size reactors including any number of designs. For example, the model can be used in commercial-scale reactions, such as gas-phase fluidized-bed polymerization reactions, that can be monitored and optionally also controlled in accordance with the invention. Some such reactions can occur in a reactor having the geometry of the fluidized bed reactor 102 discussed with respect to FIG. 1A. In other embodiments, a reactor is monitored and optionally also controlled in accordance with the invention while it operates to perform polymerization using any of a variety of different processes (e.g., slurry, or gas phase processes).

FIG. 1A is a schematic diagram of a polymerization system 100 that can be monitored and controlled in accordance with embodiments described herein. The polymerization system 100 includes a fluidized bed reactor 102. The fluidized bed reactor 102 has a bottom end 104, a top expanded section 106, a straight section 108, and a distributor plate 110 within the straight section 108. A fluidized bed 112 of granular polymer and catalyst particles is contained within the straight section 108, and may optionally extend slightly into the top expanded section 106. The bed is fluidized by the steady flow of recycle gas 114 through the distributor plate 110. The flow rate of the recycle gas 114 is regulated to circulate the fluidized bed 112, as illustrated in FIG. 1A. In some implementations, a superficial gas velocity of about 1 ft/sec to about 3 ft/sec is used to maintain a fluidized bed 112 in the reactor 102 while operating the reactor 102 at a total pressure of about 300 psi.

The polymerization system 100 has one or more catalyst feeders 116 for controlling the addition of polymerization catalyst 118 to a reaction zone 120 within the fluidized bed 112. Within the reaction zone 120, the catalyst particles react with a primary monomer (e.g., ethylene) and optionally a comonomer and other reaction gases (e.g., hydrogen) to produce the granular polymer particles. As new polymer particles are produced, other polymer particles are continually withdrawn from the fluidized bed 112 through a product discharge system 122. The fluidized bed 112 may be maintained at a constant height by withdrawing a portion of the fluidized bed 112 at a rate equal to the rate of formation of particulate product. The product may be removed continuously or nearly continuously via a series of valves (not shown) into a fixed volume chamber (not shown), which is simultaneously vented back to the reactor. This allows for highly efficient removal of the product, while recycling a large portion of the unreacted gases back to the reactor.

After passing through the product discharge system 122, the polymer granules are degassed (or "purged") with a flow of inert gas such as nitrogen to remove substantially all of the dissolved hydrocarbon materials. In some instances, the polymer granules may be treated with a small stream of humidified nitrogen to deactivate any trace quantities of residual catalyst.

The polymerization system 100 also has a cooling loop which includes a recycle gas line 124, a cooler 126 (such as a circulating gas cooler), and a compressor 128, coupled with the fluidized bed reactor 102. During operation, the cooled circulating gas from the cooler 126 flows through inlet 130 into the fluidized bed reactor 102, then propagates upward through the fluidized bed 112 and out from the fluidized bed reactor 102 via outlet 132.

The top expanded section 106 is also known as a "velocity reduction zone," and is designed to minimize the quantities of particle entrainment from the fluidized bed. The diameter of the top expanded section 106 generally increases with the distance from straight section 108. The increased diameter causes a reduction in the speed of the recycle gas 114, which allows most of the entrained particles to settle back into the fluidized bed 112, thereby minimizing the quantities of solid particles that are "carried over" from the fluidized bed 112 through the recycle gas line 124. Finer entrained particles and dust may optionally be removed in a cyclone and/or fines filter (not shown). In some instances, a screen (not shown) may be included upstream of the compressor 128 to remove larger material.

To maintain a reactor temperature, the temperature of the recycle gas 114 may be continuously adjusted up or down to accommodate any changes in the rate of heat generation due to the polymerization. One or more temperature sensors 134 may be located in the fluidized bed, and used with a control system and the cooling loop to control the temperature $T_{rx}$ of the fluidized bed 112 near the process set-point. Heated reactor gas 136, which carries heat energy from the fluidized bed reactor 102, is withdrawn from the outlet 132 and is pumped by the compressor 128 to the cooler 126 wherein the temperature of the heated reactor gases 136 is reduced and at least some of the ICA present are condensed to a liquid. The recycle gas 114 from the cooler 126, including any condensed liquids, flows to the reactor inlet 130 to cool the fluidized bed 112. Temperature sensors (not shown) near the inlet and outlet of the cooler 126 may provide feedback to a control system (FIG. 1B) to regulate the amount by which cooler 126 reduces the temperature of the recycle gas 114 entering the fluidized bed reactor 102.

The fluidized bed reactor 102 may also include skin temperature sensors 135, mounted in positions along a wall of the straight section 108 of the fluidized bed reactor 102 so as to protrude into the bed from the reactor wall by a small amount (e.g., about one eighth to one quarter of an inch). The skin temperature sensors 135 may be configured and positioned to sense the temperature $T_w$ of the resin near the wall of the fluidized bed reactor 102 during operation.

The temperature sensors 134 in the fluidized bed 112 can include a resistance temperature sensor positioned and configured to sense bed temperature during reactor operation at a location within the fluidized bed reactor 102 away from the reactor wall. The resistance temperature sensor can be mounted so as to protrude into the bed more deeply than the skin temperature sensors 135 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties are conventionally measured by periodically sampling the resin as it exits the reactor (e.g., about once per hour), and performing the appropriate tests in a quality control laboratory.

Other measured reaction parameters may include reactor gas composition (e.g., concentrations and partial pressures of reactant gases, ICA, inert gases, and isomers of other materials, such as nitrogen, inert hydrocarbon, and the like). The reactor gas composition may be measured with a gas chromatograph system 138.

The process control variables may be controlled to obtain the desired productivity for the polymerization system 100 and properties for the resin. For example, the parameters used to control gas phase composition within the fluidized bed reactor 102 can include the concentration and composition of the ICA and comonomer, the partial pressure of monomer, the type and properties of catalysts, and the temperature of the reaction process. For example, it is known that a polymerization reaction during a transition may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition.

Figure 1B:
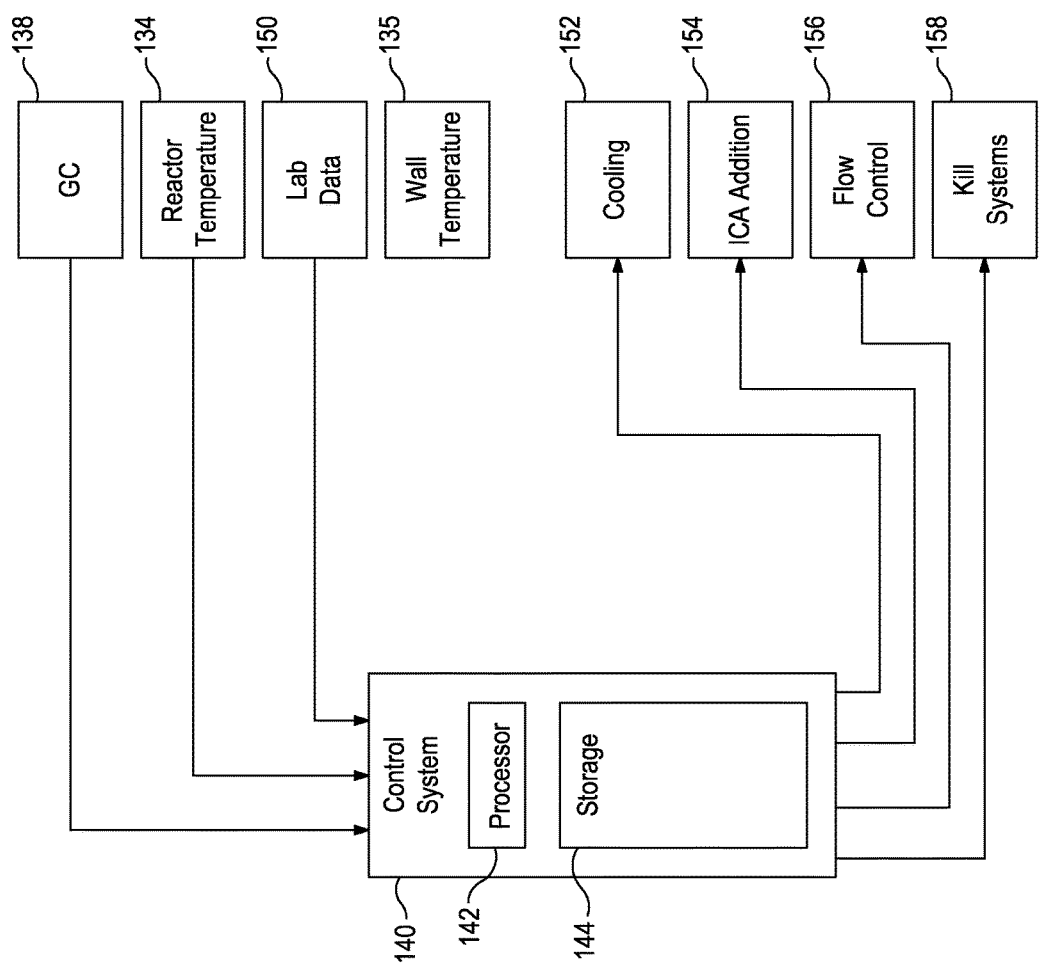
FIG. 1B is a block diagram of a control system that can be used to control the polymerization system in accordance with some of the embodiments described herein.

FIG. 1B is a block diagram of a control system 140 that can be used to control the polymerization system 100. The control system 140 may be a distributed control system (DCS), a direct digital controller (DDC), a programmable logic controller (PLC), or any other suitable system or combination of systems. The control system 140 has a processor 142 that implements machine readable instructions from a storage system 144. Illustrative processors may include a single core processor, a multiple core processor, a virtual processor, a virtual processor in a cloud implementation, an application specific integrated circuit (ASIC), or any combination of these systems. Illustrative storage systems 144 can include random access memory (RAM), read only memory (ROM), hard drives, virtual hard drives, RAM drives, cloud storage systems, optical storage systems, physically encoded instructions (for example, in an ASIC), or any combination of these systems.

Adjustments to control settings may be determined based on the output of temperature sensors 134 and 135, the GC 138, and lab data 150, among others. After determining new control settings, the control system 140 may make, or recommend, adjustments, for example, to the process cooling systems 152, the ICA addition and recycling systems 154, flow control systems 156, and kill systems 158, among others.

One skilled in the art would readily recognize that the reactor and associated methods may be an element of a staged reactor employing two or more reactors in series, wherein one reactor may produce, for example, a high molecular weight polyolefin and another reactor may produce a low molecular weight polyolefin.

Polyolefin Production Methods

Polyolefin polymerization may be performed by contacting in a reactor (e.g., fluidized bed reactor 102 of FIG. 1A) an olefin monomer and optionally a comonomer with a catalyst system in the presence of ICA and optionally hydrogen. The individual flow rates of olefin monomer, optional comonomer, optional hydrogen, and ICA (or components thereof) may be controlled to maintain fixed gas composition targets. The concentration of all gases may be measured with a chromatograph. A solid catalyst, a catalyst slurry, or liquid solution of the catalyst may be injected directly into the reactor using a carrier gas (e.g., purified nitrogen), where the feed rate of catalyst may be adjusted to change or maintain the catalyst inventory in the reactor.

The methods described herein relate to changes in the polyolefin production parameters to mitigate the presence of small gels in thin films produced with the polyolefin product. In some instances, small gels may be reduced by producing a polyolefin with a higher melt index (e.g., at low residence times and low ICA concentration in the reactor). And, in some instances, small gels may be reduced by producing a polyolefin with a lower melt index (e.g., at longer residence times or higher concentrations of ICA in the reactor). However, in many instances, melt index is generally a critical part of the polyolefin product specification and, therefore, is not manipulated.

Two parameters that can be manipulated while maintaining or substantially maintaining (e.g., within about 10% or less) the melt index are polyolefin residence time in the reactor and ICA concentration in the reactor. It has been discovered that increasing by 10% or less the residence time, increasing the ICA concentration, or both, reduce the occurrences of small gels in a polyolefin thin film. In some instances, only one of the residence time and the ICA concentration may be manipulated to mitigate the presence of small gels in polyolefin thin films. In some instances, both the residence time and the ICA concentration may be manipulated to mitigate the presence of small gels in polyolefin thin films.

In some instances, the ICA concentration in the reactor may be about 1 mol % of total reactor gas or greater, about 1 mol % to about 30 mol % of total reactor gas, about 3 mol % to about 30 mol % of total reactor gas, about 6 mol % to about 30 mol % of total reactor gas, about 8 mol % to about 30 mol % of total reactor gas, or about 10 mol % to about 30 mol % of total reactor gas. In some instances where the ICA concentration is used to mitigate the presence of small gels, the ICA concentration in the reactor may be about 6 mol % of total reactor gas or greater, about 6 mol % to about 30 mol % of total reactor gas, about 8 mol % to about 30 mol % of total reactor gas, or about 10 mol % to about 30 mol % of total reactor gas.

In some instances, polyolefin residence time in the reactor may be about 1 hour or greater, about 1 hour to about 6 hours, about 2 hours to about 6 hours, or about 3 hours to about 5 hours. In some instances where the polyolefin residence time is used to mitigate the presence of small gels, the polyolefin residence time in the reactor may be about 3 hours or greater, about 3 hours to about 6 hours, or about 4 hours to about 6 hours.

The concentration of hydrogen (when present), olefin monomer, and any optional comonomers in the reactor may be manipulated to maintain or adjust the melt index, melt index ratio, and density of the polyolefin product as one or both of the ICA concentration and the polyolefin residence time are adjusted.

In some instances, the melt index of the polyolefin may be less than about 100 g/10 min at 2.16 kg and 190° C., about 0 g/10 min to about 100 g/10 min at 2.16 kg and 190° C., about 0 g/10 min to about 20 g/10 min at 2.16 kg and 190° C., about 0 g/10 min to about 10 g/10 min at 2.16 kg and 190° C., or about 0 g/10 min to about 2 g/10 min at 2.16 kg and 190° C.

In some instances, a melt index ratio of the polyolefin (which as used herein refers to the ratio of the melt index in g/10 min at 21.6 kg and 190° C. and the melt index in g/10 min at 2.16 kg) may be less than about 50, about 15 to about 50, about 20 to about 50, or about 20 to about 30.

In some instances, the density of the polyolefin may be about 0.90 g/cc to about 0.97 g/cc or about 0.91 g/cc to about 0.95 g/cc.

The olefin monomer concentration may be controlled and monitored by the olefin monomer partial pressure. In some embodiments, the olefin monomer partial pressure may be up to about 600 psi (4138 kPa), about 100 psi (690 kPa) to about 600 psi (4138 kPa), about 100 psi (1379 kPa) to about 400 psi (2759 kPa), or about 150 psi (1724 kPa) to about 250 psi (2414 kPa).

The comonomer concentration may be controlled and monitored by a comonomer to olefin monomer mole ratio (or alternatively, the flow rates of comonomer and olefin monomer are held at a fixed ratio). When present, the comonomer may be at any relative concentration to the olefin monomer that will achieve the desired weight percent incorporation of the comonomer into the finished polyolefin. In some embodiments, the comonomer may be present with the olefin monomer in a mole ratio range in the gas phase of from about 0.0001 to about 50 (comonomer to olefin monomer), from about 0.0001 to about 5 in another embodiment, from about 0.0005 to about 1.0 in yet another embodiment, and from about 0.001 to about 0.5 in yet another embodiment.

The olefin monomer or comonomers, for example, may contain from 2 to 18 carbon atoms in some embodiments. In another embodiment, the olefin monomer may be ethylene, and a comonomer may comprise from 3 to 12 carbon atoms. In yet another embodiment, the olefin monomer may be ethylene or propylene, and a comonomer may comprise from 4 to 10 carbon atoms. In another embodiment, the olefin monomer may be ethylene or propylene, and a comonomer may comprise from 4 to 8 carbon atoms. Exemplary alpha-olefins that may be utilized as a comonomer in embodiments describe herein may include, but are not limited to, ethylene, propylene, 1-butene, 1-pentene, 1-hexene, 1-heptene, 1-octene, 4-methylpent-1-ene, 1-decene, 1-dodecene, 1-hexadecene, and the like, and any combination thereof. Additionally, a polyene may be used as a comonomer according to some embodiments described herein. Exemplary polyenes may include, but are not limited to, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described herein.

Examples of polymers that can be produced in accordance with the method described herein may include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$-$C_{18}$ alpha olefin; and terpolymers of one or more $C_2$-$C_{18}$ alpha olefins with a diene. In some embodiments, the polyolefin produced by the method described herein may include olefin homopolymers (e.g., homopolymers of ethylene or propylene). In some instances, the polyolefin produced may be copolymers, terpolymers, and the like of the olefin monomer and the comonomer. In some embodiments, the polyolefin produced may be a polyethylene or a polypropylene. Exemplary polyethylenes produced by the methods described herein may be homopolymers of ethylene or interpolymers of ethylene and at least one alpha-olefin (comonomer) wherein the ethylene content may be at least about 50% by weight of the total monomers involved. Exemplary polypropylenes produced by the methods described herein may be homopolymers of propylene or interpolymers of propylene and at least one alpha-olefin (comonomer) wherein the propylene may be at least about 50% by weight of the total monomers involved.

Hydrogen gas is often used in olefin polymerization to control the final properties of the polyolefin. For some types of catalyst systems, increasing concentrations (or partial pressures) of hydrogen may alter the molecular weight or melt index of the polyolefin generated. The melt index can thus be influenced by the hydrogen concentration. Generally, the amount of hydrogen in the polymerization is expressed as a mole ratio relative to the total polymerizable monomer (e.g., relative to ethylene or relative to a blend of ethylene and hexene or propylene). The amount of hydrogen used in some polymerization processes is an amount necessary to achieve the desired melt index (or molecular weight) of the final polyolefin resin. In some embodiments, the mole ratio in the gas phase of hydrogen to total polymerizable monomer ($H_2$ to monomer) may be greater than about 0.00001, greater than about 0.0005, greater than about 0.001, less than about 10, less than about 5, less than about 3, or less than about 0.10, wherein a desirable range may comprise any combination of any upper mole ratio limit with any lower mole ratio limit described herein. Expressed another way, the amount of hydrogen in the reactor at any time may range to up to about 10 ppm in some embodiments, up to about 100 or about 3000 or about 4000 or about 5000 ppm in other embodiments, between about 10 ppm and about 5000 ppm in yet another embodiment, or between about 500 ppm and about 2000 ppm in another embodiment.

Exemplary catalysts suitable for use in the embodiments described herein may include, but are not limited to, Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

Metallocenes as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, these compounds may be referred to as "metallocenes" or "metallocene catalyst components." The metallocene catalyst component may be supported on a support material, and may be supported with or without another catalyst component. In some embodiments, the one or more metallocene catalyst components are represented by the formula (I):

$$Cp^A Cp^B MX_n \qquad (I)$$

wherein M is a metal atom selected from the group consisting of Groups 3 through 12 atoms and lanthanide Group atoms in some embodiments. For example, M may be selected from Ti, Zr, Hf atoms. Each leaving group X is chemically bonded to M; each Cp group is chemically bonded to M; and n is 0 or an integer from 1 to 4, and may be either 1 or 2 in a particular embodiment.

The Cp ligands may be one or more rings or ring systems, at least a portion of which includes Å-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, $Cp^A$ and $Cp^B$ are independently selected from the group consisting of cyclopentadienyl, indenyl, tetrahydroindenyl, fluorenyl, and substituted derivatives of each. As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls may include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

In some embodiments, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization.

The structure of the metallocene catalyst component may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts described in U.S. Patent Application Publication Nos. US2005/0124487A1, US2005/0164875A1, and US2005/0148744. In some embodiments, the metallocene may be formed with a hafnium metal atom (e.g., bis(n-propylcyclopentadienyl) hafnium $X_n$, bis(n-butylcyclopentadienyl) hafnium Xn, or bis(n-pentylcyclopentadienyl) hafnium $X_n$, where X is one of chloride or fluoride and n is 2), such as is described in U.S. Pat. Nos. 6,242,545 and 7,157,531. In some instances, a polyolefin with a wide molecular weight distribution produced with a hafnium metallocene catalyst may be particularly prone to the formation of small gels in thin films.

In certain embodiments, the metallocene catalyst components described above may include their structural or optical or enantiomeric isomers (racemic mixture), and, in some embodiments, may be a pure enantiomer.

In some embodiments, the catalyst may be a metallocene catalyst in the absence of, or essentially free of, any scavengers (e.g., triethylaluminum, trimethylaluminum, tri-isobutylaluminum, tri-n-hexylaluminum, diethyl aluminum chloride, dibutyl zinc and the like). By "essentially free," it is meant that these compounds are not deliberately added to the reactor or any reactor components, and if present, are present in less than about 1 ppm in the reactor.

In some embodiments, the catalysts may be used with cocatalysts and promoters (e.g., alkylaluminums, alkylaluminum halides, alkylaluminum hydrides, and aluminoxanes).

In some instances, the one or more catalysts may be combined with up to about 10 wt % of one or more antistatic agents as are known in the art, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

In some instances, supported catalyst(s) may be combined with activators by tumbling and/or other suitable means, optionally with up to about 2.5 wt % (by weight of the catalyst composition) of an antistatic agent. Exemplary antistatic agent may include, but are not limited to, an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of this method of addition is that it permits on-line adjustment of the level of the additive. The antistatic agents may individually be in a solution, slurry, or as a solid (preferably as a powder) before introduction into the reactor.

In various embodiments, a polymerization reaction according to the methods described herein may optionally employ other additives, such as inert particulate particles.

In some embodiments, the polymerization reaction may be performed at a reactor pressure of up to about 600 psi (4138 kPa), about 100 psi (690 kPa) to about 600 psi (4138 kPa), about 200 psi (1379 kPa) to about 400 psi (2759 kPa), or about 250 psi (1724 kPa) to about 350 psi (2414 kPa).

In some embodiments, the polymerization reaction temperature may be about 30° C. to about 120° C., about 60° C. to about 115° C., about 70° C. to about 110° C., or about 70° C. to about 105° C.

Embodiments disclosed herein include Embodiment A, Embodiment B, and Embodiment C.

Embodiment A: A method that includes contacting in a fluidized bed gas phase reactor an olefin monomer with a catalyst system in the presence of an induced condensing agent (ICA) and optionally hydrogen to produce a first polyolefin having a first melt index; increasing (1) a concentration of the ICA in the reactor, (2) a residence time of the first polyolefin in the reactor, or (3) both to produce a second polyolefin having a second melt index, wherein the second melt index is within 10% of the first melt index; and wherein a first thin film formed of the first polyolefin has a larger small gel count than a second thin film formed of the second polyolefin, wherein the first and second thin film are produced by a same procedure.

Embodiment B: A method that includes contacting in a fluidized bed gas phase reactor an olefin monomer with a catalyst system in the presence of an induced condensing agent (ICA) and optionally hydrogen to produce a first polyolefin having a first melt index; performing at least one of (1) increasing a concentration of the ICA in the reactor, (2) increasing a residence time of the first polyolefin in the reactor, or (3) decreasing the first melt index to produce a second polyolefin having a second melt index; and wherein a first thin film formed of the first polyolefin has a larger small gel count than a second thin film formed of the second polyolefin, wherein the first and second thin film are produced by a same procedure.

Embodiments A and B may have one or more of the following additional elements in any combination: Element 1: wherein the catalyst system comprises hafnium metallocene catalyst; Element 2: wherein the concentration of ICA in the reactor during production of the second polyolefin is about 6 mol % to about 30 mol % of total reactor gas; Element 3: wherein the retention time of the second polyolefin in the reactor is about 1 hour to about 6 hours; Element 4: wherein the concentration of ICA in the reactor during production of the second polyolefin is about 6 mol % to about 30 mol % of total reactor gas, and wherein the retention time of the second polyolefin in the reactor is about 1 hours to about 6 hours; Element 5: Element 4 wherein the catalyst comprises hafnium metallocene catalyst; Element 6: the method further including contacting in the fluidized bed gas phase reactor the olefin monomer and at least one comonomer with the catalyst system in the presence of the ICA and optionally the hydrogen to produce the polyolefin; Element 7: Element 6 wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin; Element 8: wherein the ICA comprise one selected from the group consisting of n-butane, isobutane, n-pentane, isopentane, hexane, isohexane, and any combination thereof; and Element 9: wherein the second melt index is less than about 100 g/10 min at 2.16 kg and 190° C.

By way of non-limiting example, exemplary combinations applicable to Embodiment A and B include: Element 1 in combination with Element 6 and optionally Element 7; Element 2 in combination with Element 6 and optionally Element 7; Element 3 in combination with Element 6 and optionally Element 7; Element 4 and optionally Element 5 in combination with Element 6 and optionally Element 7; Element 8 in combination with Element 6 and optionally Element 7; Element 1 in combination with Element 2 and optionally Element 3; Element 1 in combination with Element 3; Element 2 in combination with Element 3; Element 8 in combination with any of the foregoing; and Element 9 in combination with any of the foregoing.

Embodiment C: A method that includes contacting in a fluidized bed gas phase reactor an olefin monomer with a hafnium metallocene catalyst in the presence of an induced condensing agent (ICA) and optionally hydrogen to produce a polyolefin, wherein a concentration of ICA in the reactor is about 6 mol % to about 30 mol % of total reactor gas and the retention time of the polyolefin in the reactor is about 1 hours to about 5 hours.

Embodiment C may have one or more of the following additional elements in any combination: Element 10: wherein a melt index of the polyolefin is less than about 100 g/10 min at 2.16 kg and 190° C.; Element 11: the method further including contacting in the fluidized bed gas phase reactor the olefin monomer and at least one comonomer with the catalyst system in the presence of the ICA and the hydrogen to produce the polyolefin; Element 12: Element 11 wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin; and Element 13: wherein the ICA comprise one selected from the group consisting of n-butane, isobutane, n-pentane, isopentane, hexane, isohexane, and any combination thereof.

By way of non-limiting example, exemplary combinations applicable to Embodiment A and B include: Element 13 in combination with Element 11 and optionally Element 12; Element 10 in combination with any of the foregoing; and Element 10 in combination with one of Elements 11-13.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 2:
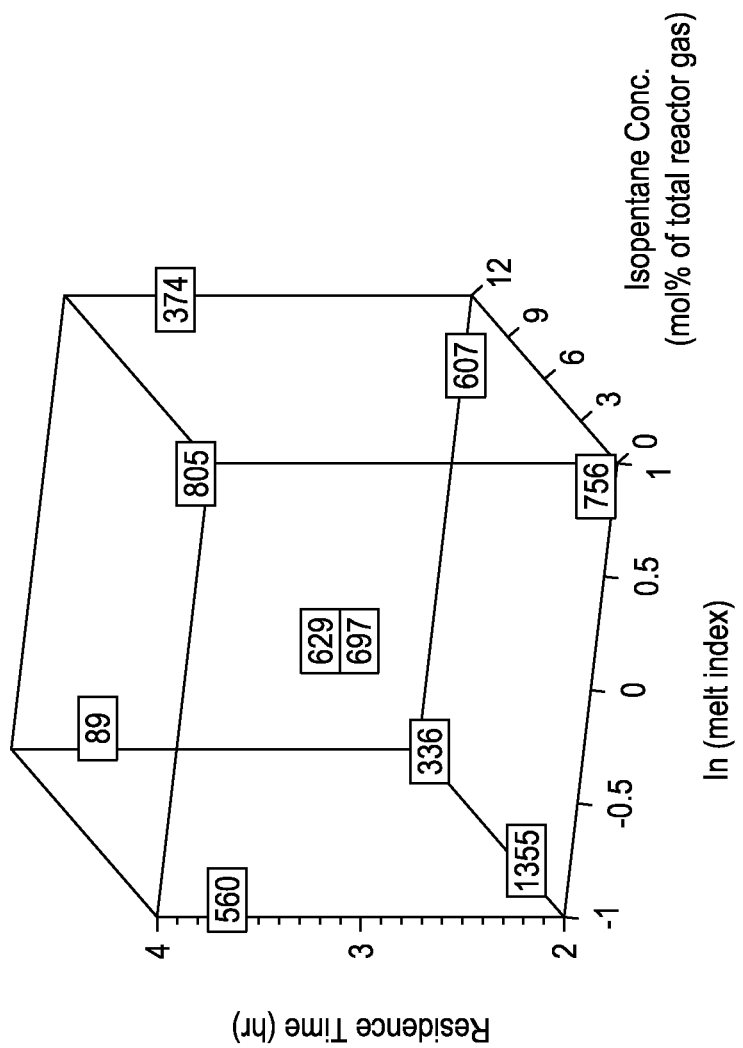
FIG. 2 provides a 3-axis plot of the small gel counts relative to the melt index (plotted as ln(melt index)), isopentane concentration, and residence time.

A series of polyolefins with various melt indices were produced at various ICA concentrations and retention times. Specifically, a hafnium metallocene catalyst was used in the polymerization of ethylene monomer in the presence of hydrogen and isopentane. The partial pressure of isopentane and the $H2_{mol}$:ethylene$_{mol}$ were adjusted to produce the polyethylene products in Table 1. Table 1 provides the small gel count results from the various polyolefin production runs. FIG. 2 provides a 3-axis plot of the small gel counts relative to the of melt index (plotted as ln(melt index)), isopentane concentration, and residence time.

TABLE 1

| Sample | Melt Index (g/10 min at 2.16 kg and 190° C.) | Isopentane Conc. (mol % of total reactor gas) | Residence Time (hours) | Small Gel Count |
|---|---|---|---|---|
| 1 | 0.43 | 6.2 | 3 | 629 |
| 2 | 0.25 | 1.8 | 2.2 | 1355 |
| 3 | 0.95 | 2.4 | 4.1 | 806 |
| 4 | 1.02 | 12 | 3.5 | 374 |
| 5 | 0.23 | 11.5 | 2 | 336 |
| 6 | 0.93 | 11 | 2 | 608 |
| 7 | 0.23 | 2.4 | 3.7 | 560 |
| 8 | 0.98 | 1.9 | 2 | 757 |
| 9 | 0.45 | 6.5 | 2.9 | 697 |
| 10 | 0.23 | 11.7 | 3.7 | 90 |

This example demonstrates that as isopentane concentration increases with a substantially unchanged residence time and melt index, the small gel count decreases (e.g., Sample 2 vs Sample 5; Sample 7 vs Sample 10; Sample 3 vs Sample 4; and Sample 8 vs Sample 6). Further illustrated is that as residence time increases with a substantially unchanged isopentane concentration and melt index, the small gel count decreases (e.g., Sample 2 vs Sample 7; Sample 5 vs Sample 10; and Sample 6 vs Sample 4). Additionally, decreasing melt index while substantially maintaining isopentane concentration and residence time appears to decrease the small gel count (e.g., Sample 3 vs Sample 7 and Sample 4 vs Sample 10). Finally, the lowest small gel count has a low melt index, high isopentane concentration, and long residence time.

The statistical significance of the data trends was analyzed with a multiple regression analysis where the t-statistic was greater than 2 and the $r^2$ was 0.88, which indicates that the data trends are statistically significant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    contacting in a fluidized bed gas phase reactor an olefin monomer with a catalyst system in the presence of an induced condensing agent (ICA) and optionally hydrogen to produce a first polyolefin having a first melt index;
    increasing by 10% or less (1) a concentration of the ICA in the reactor, (2) a residence time of the first polyolefin in the reactor, or (3) both to produce a second polyolefin having a second melt index, wherein the second melt index is within 10% of the first melt index; and
    wherein a first thin film formed of the first polyolefin has a larger count of a small gel than a second thin film formed of the second polyolefin, wherein the first and second thin film are produced by a same procedure, and wherein the small gel is a gel particle having a diameter of 201 microns to 600 microns and counting the small gel is determined by surface inspection of a 50 micron ±5 micron thin film using optoelectronic analysis.

2. The method of claim 1, wherein the catalyst system comprises hafnium metallocene catalyst.

3. The method of claim 1, wherein the concentration of ICA in the reactor during production of the second polyolefin is about 6 mol % to about 30 mol % of total reactor gas.

4. The method of claim 1, wherein the residence time of the second polyolefin in the reactor is about 1 hour to about 6 hours.

5. The method of claim 1, wherein the concentration of ICA in the reactor during production of the second polyolefin is about 6 mol % to about 30 mol % of total reactor gas, and wherein the residence time of the second polyolefin in the reactor is about 1 hour to about 6 hours.

6. The method of claim 5, wherein the catalyst comprises hafnium metallocene catalyst.

7. The method of claim 1 further comprising:
contacting in the fluidized bed gas phase reactor the olefin monomer and at least one comonomer with the catalyst system in the presence of the ICA and optionally the hydrogen to produce the polyolefin.

8. The method of claim 7, wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1, 6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

9. The method of claim 1, wherein the ICA comprise one selected from the group consisting of n-butane, isobutane, n-pentane, isopentane, hexane, isohexane, and any combination thereof.

10. A method comprising:
contacting in a fluidized bed gas phase reactor an olefin monomer with a catalyst system in the presence of an induced condensing agent (ICA) and optionally hydrogen to produce a first polyolefin having a first melt index;

performing at least one of (1) increasing a concentration of the ICA in the reactor by 10% or less, (2) increasing a residence time of the first polyolefin in the reactor by 10% or less, or (3) decreasing the first melt index to produce a second polyolefin having a second melt index, wherein the residence time of the second polyolefin in the fluidized bed gas phase reactor is about 1 hour to about 6 hours; and wherein a first thin film formed of the first polyolefin has a larger count of a small gel than a second thin film formed of the second polyolefin, wherein the first and second thin film are produced by a same procedure, and wherein the small gel is a gel particle having a diameter of 201 microns to 600 microns and counting the small gel is determined by surface inspection of a 50 micron ±5 micron thin film using optoelectronic analysis.

11. The method of claim 10, wherein the catalyst system comprises hafnium metallocene catalyst.

12. The method of claim 10, wherein the concentration of ICA in the reactor during production of the second polyolefin is about 6 mol % to about 30 mol % of total reactor gas.

13. The method of claim 10, wherein the concentration of ICA in the reactor during production of the second polyolefin is about 6 mol % to about 30 mol % of total reactor gas, and wherein the residence time of the second polyolefin in the reactor is about 1hour to about 6 hours.

14. The method of claim 10 further comprising:
contacting in the fluidized bed gas phase reactor the olefin monomer and at least one comonomer with the catalyst system in the presence of the ICA and optionally the hydrogen to produce the polyolefin.

15. The method of claim 14, wherein the olefin monomer is ethylene and the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

* * * * *